United States Patent
Kobayashi et al.

(10) Patent No.: US 6,688,950 B2
(45) Date of Patent: Feb. 10, 2004

(54) MAGNETIC RECORDING MEDIUM AND METHOD OF SMOOTHING SURFACE OF MAGNETIC RECORDING MEDIUM

(75) Inventors: Nobuyuki Kobayashi, Kanagawa (JP); Masanori Yamamoto, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/080,563

(22) Filed: Feb. 25, 2002

(65) Prior Publication Data

US 2002/0118488 A1 Aug. 29, 2002

(30) Foreign Application Priority Data

Feb. 28, 2001 (JP) ......................... 2001-055587

(51) Int. Cl.⁷ .................................. B24B 1/00
(52) U.S. Cl. ............................. 451/57; 451/28
(58) Field of Search ....................... 451/28, 41, 55, 451/57

(56) References Cited

U.S. PATENT DOCUMENTS 4,983,421 A * 1/1991 Mochizuki et al. ......... 427/130
5,009,929 A * 4/1991 Iida et al. ..................... 427/130
5,036,629 A * 8/1991 Ishikuro et al. ............... 451/57
5,512,350 A * 4/1996 Ryoke et al. ................ 428/141
5,876,270 A * 3/1999 Honma et al. ................ 451/59

FOREIGN PATENT DOCUMENTS

| JP | 6-52544 | 2/1994 |
| JP | 7-21557 | 1/1995 |
| JP | 2000-315317 | 11/2000 |

* cited by examiner

Primary Examiner—Dung Van Nguyen
(74) Attorney, Agent, or Firm—Sughrue Mion, PLLC

(57) ABSTRACT

In manufacturing a magnetic tape, a long web of non-magnetic base material is coated with a magnetic layer and, thereafter, subjected to a smoothing process, wherein the surface of the magnetic layer is abraded, ground, and then wiped out. For grinding, sapphire blades are kept in contact with the surface of the magnetic layer with their edges oriented in a transverse direction to the magnetic tape, and are moved back and forth in the transverse direction to the magnetic tape, while the magnetic tape is being conveyed in a lengthwise direction of the magnetic tape. Of the sapphire blades, adjacent two are moved in opposite directions to each other.

10 Claims, 3 Drawing Sheets

MAGNETIC RECORDING MEDIUM AND METHOD OF SMOOTHING SURFACE OF MAGNETIC RECORDING MEDIUM

BACKGROUND OF THE INVENTION

1. Field of the Invention

The present invention relates to a magnetic recording medium and a method of smoothing a surface of the magnetic recording medium.

2. Background Arts

A magnetic tape is widely used as a magnetic recording medium for recording audio signals and/or video signals. To manufacture the magnetic tape, a surface of a long web of non-magnetic base film is coated with a magnetic layer that is made by dispersing a magnetic material and a binder material in a solvent, wherein the binder material is composed of a resin and a curing agent. Thereafter, the magnetic layer is subjected to treatments for orienting the magnetic fields and the like. After drying the magnetic layer, the long web coated with the magnetic layer is slit into a predetermined width, and is coiled into a roll.

Because the magnetic tape manufactured in this way has many granular components, like insufficiently-fixed ferromagnetic powers, on the surface of the magnetic layer. These insufficiently-fixed granular components can drop off the magnetic tape as the tape is moved by a magnetic head, and stain the surface of the magnetic head, damaging the quality of the recorded or reproduced signal. As the ferromagnetic powers removes off the magnetic layer, the electromagnetic conversion characteristics of the magnetic recording medium deteriorates, which appears as an output power reduction.

To avoid this problem, a process of smoothing the surface of the magnetic layer is carried out prior to slitting the magnetic tape. In the smoothing process, the surface of the magnetic layer is abraded by means of an abrasive tape, and then ground by means of a grinding tool that is made of a very hard material, like artificial sapphire or ruby, or carbide alloy, thereby to remove the insufficiently-fixed granular components or extraneous substances deposited on the magnetic layer. Thereafter, because shavings produced by the abrading and grinding of the magnetic layer may be deposited on the surface of the magnetic layer, the magnetic tape is subjected to a cleaning process for cleaning the shavings off the magnetic layer.

The grinding tool used in the smoothing process for the magnetic layer has conventionally been fixed in position, so the contact position of the grinding tool with the magnetic layer is maintained unchanged. As a result, the grinding tool is worn off earlier around the contact position, which results a stepped portion on the edge of the grinding tool. The stepped portion provides scratches or scuff marks on the magnetic layer.

SUMMARY OF THE INVENTION

In view of the foregoing, an object of the present invention is to provide a magnetic recording medium free from scuff marks and scratches on its surface.

Another object of the present invention is to provide a method of smoothing a surface of a magnetic recording medium.

In a magnetic recording medium manufactured by coating a long web of non-magnetic base material with a magnetic layer, according to the present invention, a surface of the magnetic layer of the magnetic recording medium is ground by at least a grinding tool that is moved back and forth in a transverse direction to the long web, while the magnetic recording medium is being conveyed in a lengthwise direction of the long web.

Since the grinding tool is moved back and forth in the transverse direction, the grinding tool would not be kept contact in the same portion with the magnetic recording medium, but the portion of the grinding tool that is in contact with the magnetic recording medium and is thus grinding the surface of the magnetic layer changes continually. Accordingly, the problem of partial abrasive wear of the grinding tool would not arise, so the grinding tool is prevented from having a stepped portion on its edge. Thus, the magnetic recording medium of the present invention is free from the scuff marks or the scratches that could otherwise be caused by the stepped portion.

According to another aspect of the present invention, a method of smoothing a surface of a magnetic layer of a magnetic recording medium after manufacturing the magnetic recording medium by coating a long web of non-magnetic base material with the magnetic layer, comprising the steps of putting at least a grinding tool on the surface of the magnetic layer with an edge of the grinding tool oriented in a transverse direction to the long web; and moving the grinding tool back and forth in the transverse direction while conveying the magnetic recording medium in a lengthwise direction of the long web.

According to a preferred embodiment, a plurality of the grinding tools are arranged at regular intervals along the conveying direction of the magnetic recording medium, and adjacent two of the grinding tools are moved in opposite directions to each other. Thereby, the magnetic recording medium is prevented from fluctuating in the widthwise direction during the grinding.

It is preferable to move the grinding tool at a high speed in initial and final stages of one stroke, and at a low speed in a middle stage of one stroke. This configuration enforces the effect of preventing the partial abrasive wear of the edge of the grinding tool.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
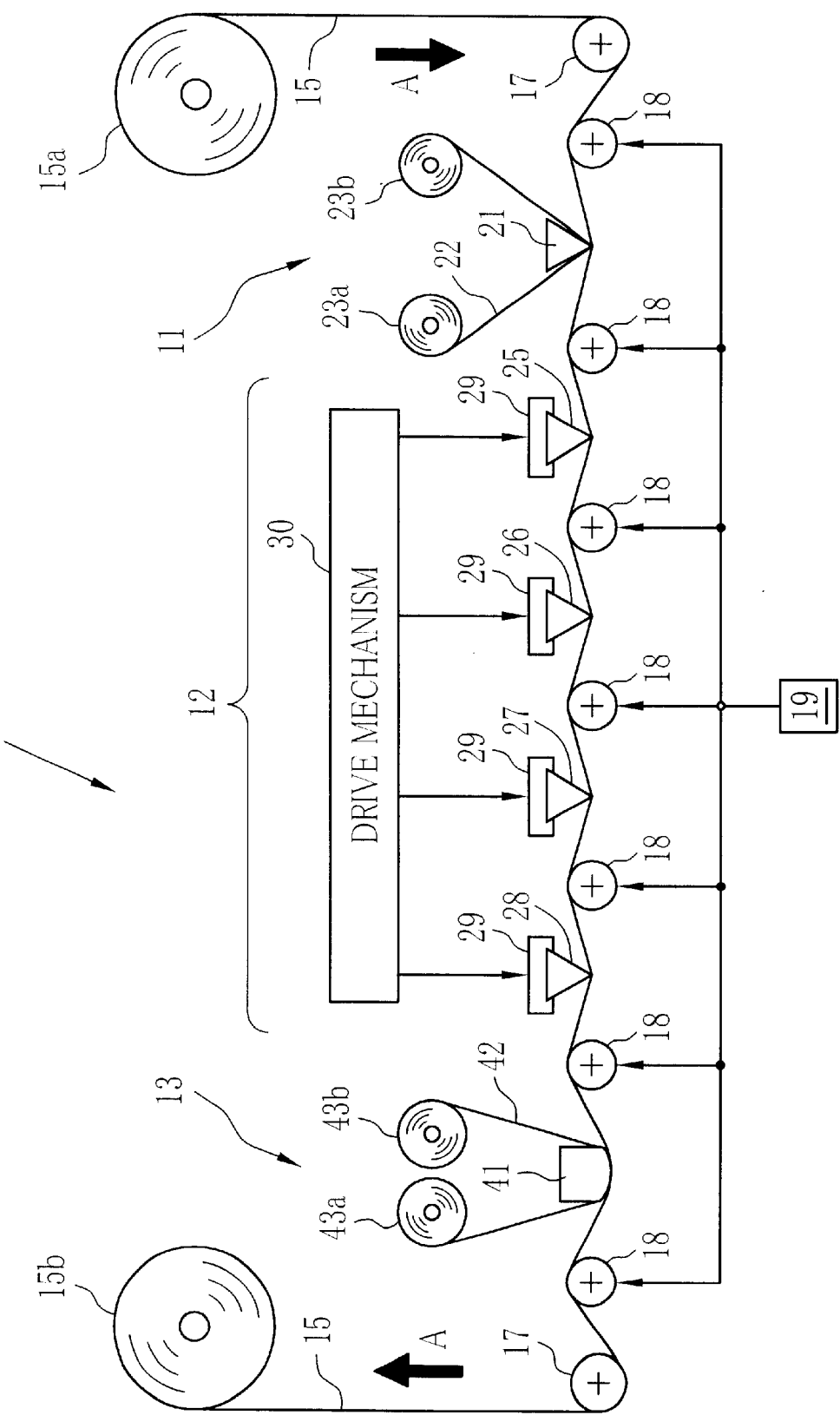
FIG. 1 schematically shows a smoothing apparatus for smoothing the surface of a magnetic tape, embodying the method of the present invention.

A smoothing apparatus 10 shown in FIG. 1 consists of an abrading section 11, a grinding section 12 and a wiping section 13, to carry out abrasion, grinding and wiping of the surface of a magnetic layer of a magnetic tape 15 successively. The magnetic tape 15 is wound into a roll 15a, and is supplied from the roll 15a in a direction shown by an arrow "A", and is conveyed by a plurality of feed rollers 17 through from the abrading section 11, the grinding section 12 to the wiping section 13, and is rewound into a take-up roll 15b.

Tension rollers 18 are disposed in the abrading section 11, the grinding section 12 to the wiping section 13. The tension rollers 18 rotate following to the conveying movement of the magnetic tape 15, and are connected to a tension mechanism 19. The tension mechanism is controlled such that the magnetic tape 15 is brought into contact with an abrasive tape 22, sapphire blades 25, 26, 27 and 28 and a non-woven tape 42 with a proper tension. The proper tension is preferably 30 g to 300 g per one tape, while the magnetic tape 15 is preferably conveyed at a speed of 7 m/sec to 10 m/sec.

The abrading section 11 is constituted of a supply roll 23a and a take-up roll 23b of the abrasive tape 22 and a pad or post 21 for the abrasive tape 22. While the magnetic tape 15 is being conveyed, the supply roll 23a and the take-up roll 23b are rotating to feed the abrasive tape 22 in an opposite direction to the conveying direction "A" of the magnetic tape 15, and the pad 21 presses the abrasive tape 22 onto the magnetic layer of the magnetic tape 15. Thus the abrasive tape 22 abrades the surface of the magnetic layer. The abrasive tape 22 is manufactured by coating a base material with an abrasive coat that is composed of an abrasive agent dispersed in a binder, and then slitting the base material into a width after drying the abrasive coat. The base material may be a synthetic resin film or sheet, e.g. a polyethylene terephthalate film, or a non-magnetic metal foil, e.g. an aluminum foil, or a metal foil, e.g. a stainless steel foil, or paper, ceramic sheet or the like. The abrading agent may be composed of a combination of materials having a Mohs hardness of 5 to 9, e.g. diamond, $SiO_2$, $Cr_2O_3$, $ZnO_2$.

The grinding section is constituted of the sapphire blades 25 to 28, holders 29 for holding the sapphire blades 25 to 28, and a driving mechanism 30 for driving the holders 29 to move back and forth in a transverse direction to the magnetic tape 15, i.e. a widthwise direction of the magnetic tape 15. The sapphire blades 25 to 28 are ordinary sapphire blades having a shape of a triangular prism each, and are aligned along the conveying direction or lengthwise direction of the magnetic tape 15 at predetermined intervals. The edge of each sapphire blade 25 to 28 is oriented transversely to the magnetic tape 15, i.e. across the width of the magnetic tape 15, and is kept in contact with the surface of the magnetic layer of the magnetic tape 15 by the tension rollers 18.

Figure 2:
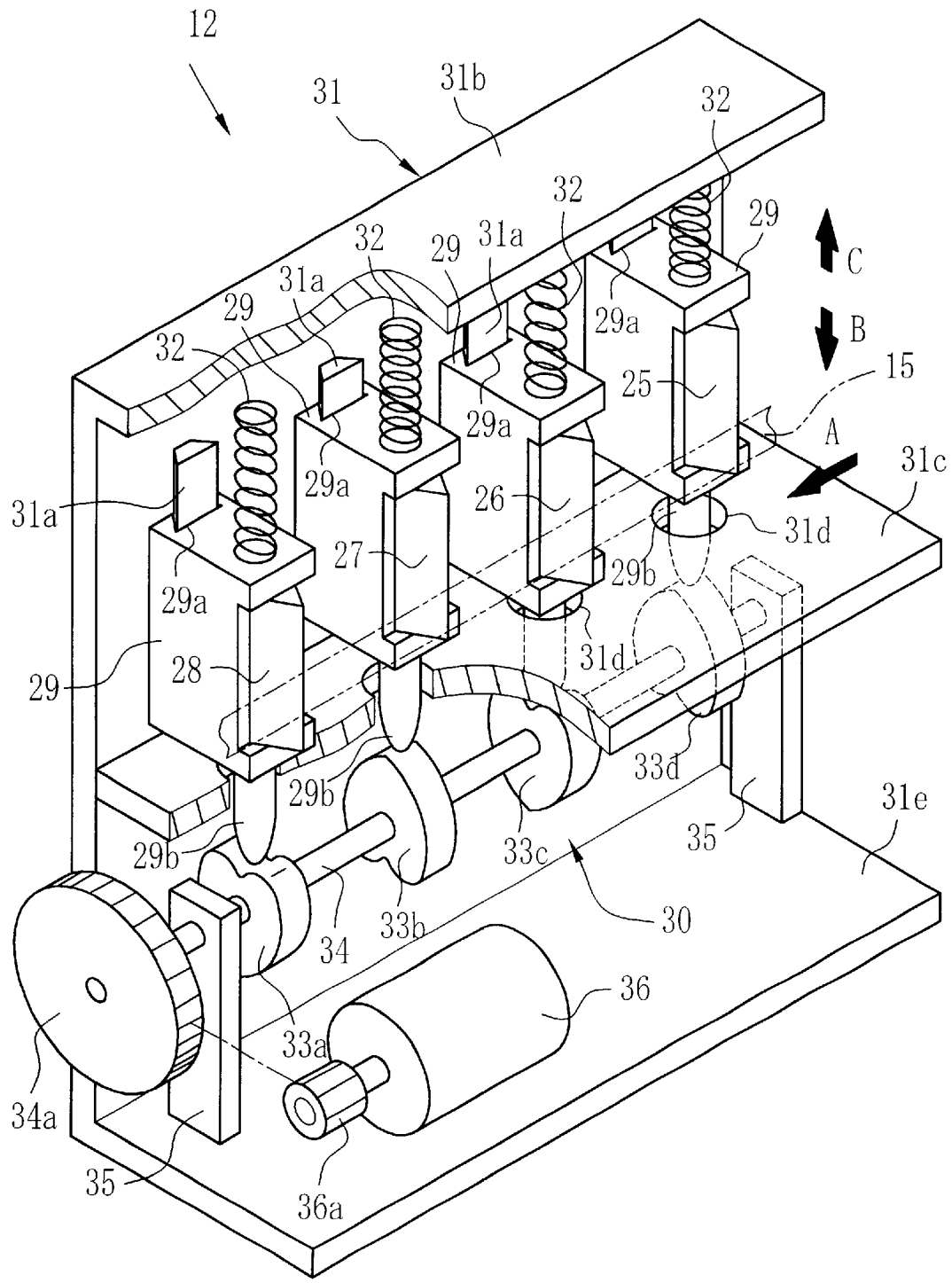
FIG. 2 shows a perspective view of a grinding section of the smoothing apparatus.

As shown in FIG. 2, the holders 29 are mounted in a base frame 31 with their guide grooves 29a engaged with guide rails 31a of the base frame 31. The guide rails 31a extend perpendicularly to the conveying direction "A" of the magnetic tape 15, such that the holders 29 are movable along the guide rails 31a back and forth in the transverse direction to the magnetic tape 15, as indicated by arrows "B" and "C". A coiled spring 32 is disposed between a top side of each holder 29 and a top wall 31b of the base frame 31, so as to urge the holders 29 to move in one direction shown by the arrow "B", i.e. downward in the drawings. A drive pin 29b is provided on the bottom of each holder 29. Since the holders 29 are urged downward, the drive pins 29b are put down through holes 31d of a middle wall 31c of the base frame 31, and are kept in contact with peripheral surfaces of cam members 33a, 33b, 33c and 33d.

The cam members 33a to 33d are coupled to each other through a rotary shaft 34, and rotate together with the rotary shaft 34. The rotary shaft 34 is pivotally held between a pair of holding arms 35 that are formed on a bottom wall 31e of the base frame 31. A transmission gear 34a is securely mounted on one end of the rotary shaft 34. The transmission gear 34a is coupled to a drive gear 36a of a motor 36 through a not-shown transmission mechanism, so the rotary shaft 34 and thus the cam members 33a to 33d are turned by the driving force of the motor 36. The drive pins 29b, the cam members 33a to 33d, the rotary shaft 34, the motor 36 and the gears 34a and 36a constitute the driving mechanism 30. As the cam members 33a to 33d rotate, the drive pins 29b move up and down along the peripheral surfaces of the cam members 33a to 33d, so the holders 29 and thus the sapphire blades 25 to 28 move back and forth in the transverse direction to the conveying direction "A" of the magnetic tape 15, as shown by the arrows "B" and "C".

Accordingly, the contact position of the sapphire blades 25 to 28 with the magnetic tape 15 changes continually, so the edges of the sapphire blades 25 to 28 will not be partly worn out, or a stepped portion will not easily be formed on the edge of the sapphire blade. Consequently, the magnetic tape 15 will not be scratched or scuffed by the stepped portions on the edges of the sapphire blades 25 to 28. In addition, the sapphire blades 25 to 28 last longer in comparison with those mounted stationary.

The cam members 33a and 33c for the sapphire blades 25 and 27 are mounted on the rotary shaft 34 at an angle that is staggered 180 degrees from an angular position of other two cam members 33b and 33d for the sapphire blades 26 and 28. According to this configuration, the sapphire blades 25 and 27 always move in the opposite direction to the sapphire blades 26 and 28. That is, the sapphire blades 25 and 27 move in the direction "B" as the sapphire blades 26 and 28 move in the direction "C". On the other hand, the sapphire blades 25 and 27 move in the direction "C" as the sapphire blades 26 and 28 move in the direction "B". This configuration is effective to prevent the magnetic tape 15 from being fluctuated by the movement of the sapphire blades 25 to 28, in the widthwise direction of the magnetic tape 15, i.e. in the up-down direction in the illustrated embodiment.

Figure 3:
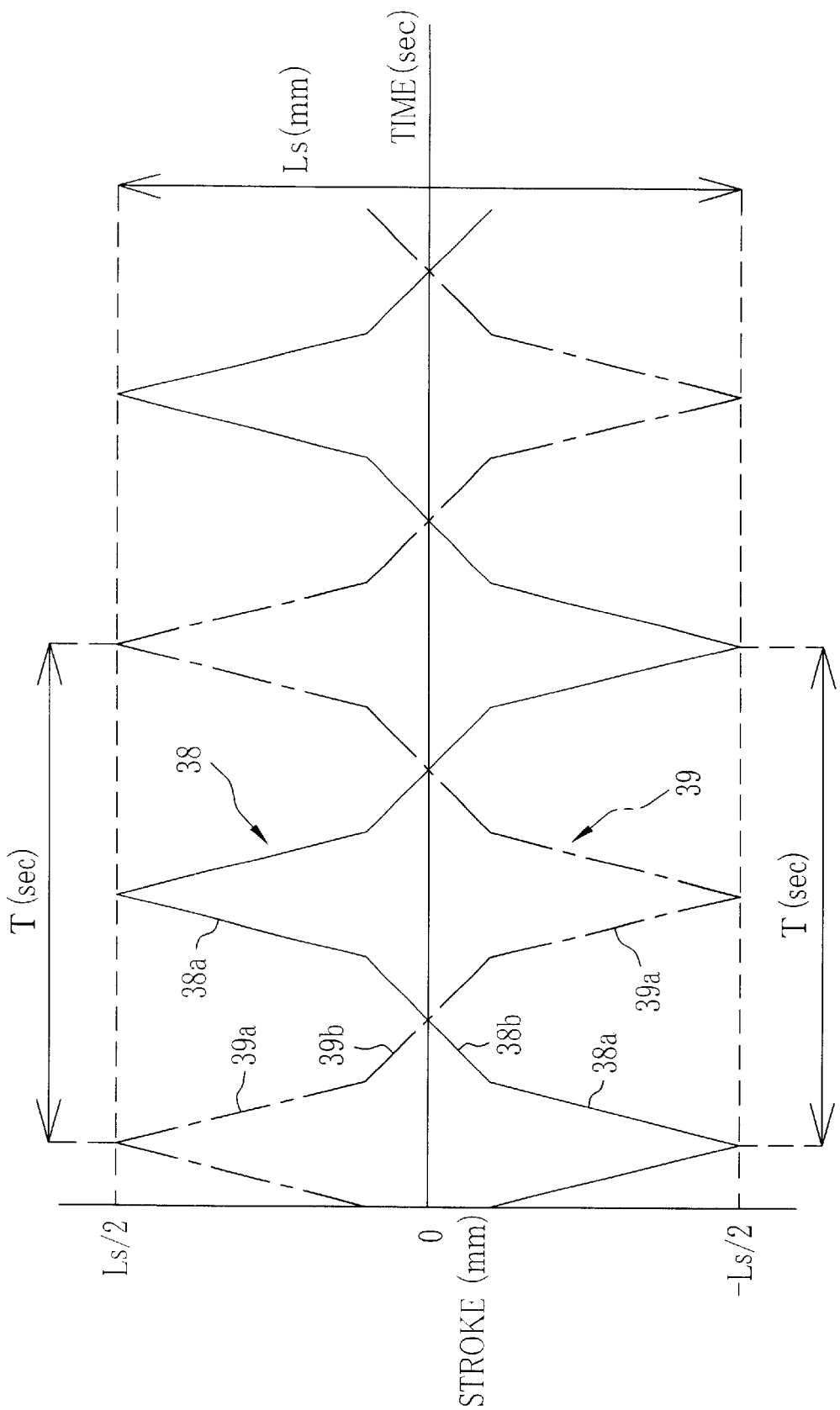
FIG. 3 shows a diagram illustrating a relationship between reciprocation of sapphire blades of the grinding section and moving speed.

Furthermore, the contour of the peripheral surface of each cam member 33a to 33d is defined such that each sapphire blade 25 to 28 changes its speed during one stroke. FIG. 3 shows the change in speed of the sapphire blades 25 to 28 during the strokes, wherein a characteristic curve 38 shown by a solid line represents the moving speed of the sapphire blades 25 and 27, and a characteristic curve 39 shown by chain-dotted lines represents the moving speed of the sapphire blades 26 and 28. As apparent from these curves in FIG. 3, each sapphire blade 25 to 28 is moved at a high speed in initial and final stages of one stroke, and is moved at a low speed in a middle stage of one stroke. Changing the moving speed of the sapphire blades 25 to 28 in this way during one stroke more effectively prevents the abrasive wear in the same portion of the edge of the sapphire blade 25 to 28, and thus prevents formation of steps in the edge.

One stroke Ls of each sapphire blade is preferably 1 mm to 2 mm in amplitude, and the time T taken for one reciprocation of each sapphire blade is preferably 10 seconds to 3 minutes, and more preferably 10 seconds to 1 minute.

Reference is made again to FIG. 1. In the wiping section 13, the non-woven tape 42 is fed in the opposite direction to the conveying direction "A" of the magnetic tape 15, by rotating a supply roll 43a and a take-up roll 43b. As the non-woven tape 42 is fed from the supply roll 43a to the take-up roll 43b, a pad 41 presses the non-woven tape 42 onto the surface of the magnetic layer of the magnetic tape 15, thereby to wipe out extraneous substances, like shavings produced by the abrading and grinding in the abrading section 11 and the grinding section 12. The non-woven tape 42 is made of a single-layered suede-like non-woven fabric that is formed from densely interlocked bundles of polyester fibers and does not substantially contain a binder, like polyurethane, or may be made of a non-woven fabric that is formed by bonding polyester fibers with a binder, like polyurethane.

Now the operation of the smoothing apparatus 10 will be briefly described.

In response to a start command entered in the smoothing apparatus 10, the magnetic tape 15 is fed out from the supply roll 15a and is conveyed through the feed rollers 17. The tension mechanism 19 applies a predetermined tension to the magnetic tape 15 through the tension rollers 18. The magnetic tape 15 first goes through the abrading section 11. In the abrading section 11, the abrasive tape 22 is brought into contact with the surface of the magnetic layer of the magnetic tape 15, and is moved in the opposite direction to the conveying direction "A" of the magnetic tape 15, thereby to abrade the surface of the magnetic layer.

Thereafter, the magnetic tape 15 goes through the grinding section 12. In the grinding section 12, the driving mechanism 30 drives the holders 29 of the sapphire blades 25 to 28 such that the sapphire blades 25 to 28 move back and forth in the transverse direction to the conveying direction "A" of the magnetic tape 15, each individually in the opposite direction to the adjacent sapphire blades, while the edges of the sapphire blades 25 to 28 are being kept in contact with the surface of the magnetic layer of the magnetic tape 15 by the tension rollers 18. The surface of the magnetic layer is thus ground by the sapphire blades 25 to 28. Through the abrasion and the grinding, granular components like insufficiently-fixed ferromagnetic powders, are removed from the surface of the magnetic layer of the magnetic tape 15.

Finally, the magnetic tape 15 goes through the wiping section 13. In the wiping section 13, the non-woven tape 42 is brought into contact with the surface of the magnetic layer of the magnetic tape 15, and is moved in the opposite direction to the conveying direction "A" of the magnetic tape 15, thereby to wipe out the extraneous substances, like shavings produced by the abrading and grinding of the magnetic layer. After passing through the abrading, grinding and wiping sections 11 to 13, the magnetic tape 15 is rewound into the take-up roll 15b.

In the illustrated embodiment, the sapphire blades are moved back and forth in the direction rectangular to the lengthwise direction of the magnetic tape, it is possible to move the sapphire blades obliquely to the lengthwise direction of the magnetic tape.

Although the sapphire blades are used as the grinding tools in the above embodiment, the grinding tools may be blades made of alumina, cermet, zirconia, silicone nitride, silicone carbide, diamond, carbide alloy and the like. Although the wiping is done only on the surface of the magnetic layer of the magnetic tape in the above embodiment, it is possible to do the wiping on the reverse surface of the magnetic tape.

Thus, the present invention is not to be limited to the above embodiment but, on the contrary, various modifications will be possible to those skilled in the art without departing from the scope of claims appended hereto.

What is claimed is:

1. A method of manufacturing a magnetic recording medium, said method comprising:
coating a long web of non-magnetic base material with a magnetic layer, wherein a surface of said magnetic layer of said magnetic recording medium is ground by at least a grinding tool that is moved back and forth in a transverse direction to said long web, while said magnetic recording medium is being conveyed in a lengthwise direction of said long web.

2. A method of smoothing a surface of a magnetic layer of a magnetic recording medium after manufacturing said magnetic recording medium by coating a long web of non-magnetic base material with said magnetic layer, said smoothing method comprising:
putting at least a grinding tool on the surface of said magnetic layer with an edge of said grinding tool oriented in a transverse direction to said long web; and
moving said grinding tool back and forth in the transverse direction while conveying said magnetic recording medium in a lengthwise direction of said long web.

3. A method as recited in claim 2, wherein a plurality of said grinding tools are arranged at regular intervals along the conveying direction of said magnetic recording medium, and adjacent two of said grinding tools are moved in opposite directions to each other.

4. A method as recited in claim 3, wherein said plurality of grinding tools are moved back and forth by means of a cam mechanism that is driven by a motor.

5. A method as recited in claim 2, wherein said grinding tool is moved at a high speed in initial and final stages of one stroke, and is moved at a low speed in a middle stage of one stroke.

6. A method as recited in claim 2, wherein said grinding tool is moved by a stroke of 1 to 2 mm.

7. A method as recited in claim 2, wherein one reciprocation of said grinding tool takes a time of 10 seconds to 3 minutes.

8. A method as recited in claim 2, wherein said magnetic recording medium is conveyed at a speed of 7 to 10 m/sec.

9. A method as recited in claim 2, wherein a tension of 30 to 300 g is applied to said magnetic recording medium while said magnetic recording medium is being conveyed, to keep the surface of said magnetic layer in contact with said grinding tool.

10. A method as recited in claim 2, wherein one reciprocation of said grinding tool takes a time of 10 seconds to 1 minute.

* * * * *